(12) United States Patent
Nishikitani et al.

(10) Patent No.: US 7,105,612 B2
(45) Date of Patent: Sep. 12, 2006

(54) PROCESS FOR PRODUCING SOLID POLYMER ELECTROLYTE

(75) Inventors: Yoshinori Nishikitani, Yokohama (JP); Masaaki Kobayashi, Yokohama (JP); Keizo Ikai, Yokohama (JP); Tsuyoshi Asano, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 267 days.

(21) Appl. No.: 10/663,411

(22) Filed: Sep. 16, 2003

(65) Prior Publication Data
US 2004/0059016 A1     Mar. 25, 2004

Related U.S. Application Data

(63) Continuation of application No. PCT/JP02/03058, filed on Mar. 28, 2002.

(30) Foreign Application Priority Data

| Mar. 28, 2001 | (JP) | ............................. 2001-092888 |
| Mar. 28, 2001 | (JP) | ............................. 2001-092889 |

(51) Int. Cl.
*C08C 19/34* (2006.01)
*C08K 5/053* (2006.01)

(52) U.S. Cl. ................ 525/330.3; 525/330.5; 525/374; 525/384

(58) Field of Classification Search ............ 525/330.3, 525/330.5, 374, 384
See application file for complete search history.

(56) References Cited

FOREIGN PATENT DOCUMENTS

| EP | 0 446 793 A1 | 9/1991 |
| JP | 60-031555 A | 2/1985 |
| JP | 02-298504 A | 12/1990 |
| JP | 04-171603 A | 6/1992 |
| JP | 05-205515 A | 8/1993 |
| JP | 08-064028 A | 3/1996 |
| JP | 10-007759 A | 1/1998 |
| JP | 10-017708 A | 1/1998 |
| JP | 10-017709 A | 1/1998 |
| JP | 10-188666 A | 7/1998 |
| JP | 2000-021234 A | 1/2000 |
| JP | 2000-149991 A | 5/2000 |
| JP | 2000-228234 | * 8/2000 |
| JP | 2000-228234 A | 8/2000 |
| JP | 2001-035251 A | 2/2001 |

* cited by examiner

*Primary Examiner*—Roberto Rabago
(74) *Attorney, Agent, or Firm*—Akin Gump Strauss Hauer & Feld, LLP

(57) ABSTRACT

The process of the present invention can easily produce a solid polymer electrolyte having a high ion conductivity, by reacting an acrylic copolymer comprising structural units represented by the following formulas (I) and (II) with a compound represented by formula (III) Y—R—Y, provided that in formulas (II) and (III), X and Y are a combination of an isocyanate group and a hydroxyl group, thereby being solidified

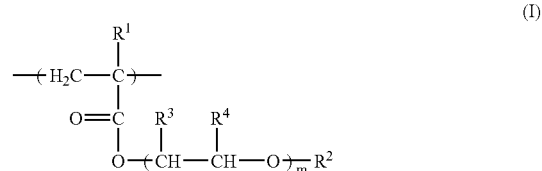

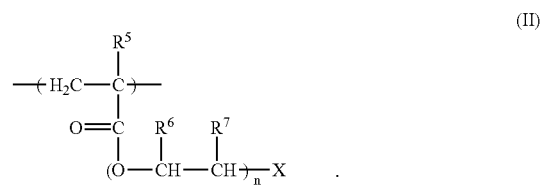

1 Claim, No Drawings

PROCESS FOR PRODUCING SOLID POLYMER ELECTROLYTE

CROSS-REFERENCE TO RELATED APPLICATION

This application is a continuation of International Application No. PCT/JP02/03058, filed Mar. 28, 2002, the disclosure of which is incorporated herein by reference.

FIELD OF THE INVENTION

This invention relates to a process for producing solid polymer electrolytes and more particularly those which are suitably used in electrochromic devices, secondary batteries, capacitors, and the like and enhanced in ion conductivity.

BACKGROUND OF THE INVENTION

In recent years, organic solid polymer electrolytes have been extensively developed, which electrolytes have properties such as formability, a capability of being easily formed into a large area film, flexibility, and excellent adhesivity to electrodes, comparing with inorganic solid electrolytes.

Some polymers have been proposed in the form of organic solid polymer electrolytes. However, since for example, such polymers have been produced by electrolytic polymerization or a process requiring a long reaction time as disclosed in Japanese Patent Laid-Open Publication Nos. 4-171603 and 60-31555, the processes disclosed therein had a problem in productivity. The process disclosed in Japanese Patent Laid-Open Publication No. 2-298504 involves copolymerization of a precursor monomer and thus may encounter the shrinkage of the product caused by the polymerization, leading to a problem that it is difficult to produce such polymers easily from the industrial point of view.

DISCLOSURE OF THE INVENTION

The present invention solves the above problems by providing a process for producing solid polymer electrolytes with high ion conductivity.

That is, the present invention relates to a process for producing a solid polymer electrolyte wherein at least the following components (a) and (b) are reacted:

(a) an acrylic copolymer comprising repeating units represented by formula (I) below (hereinafter referred to as Structural Unit I) and repeating units represented by formula (II) below (hereinafter referred to as Structural Unit II) in a molar ratio of from 1/5 to 1,000/1 and having a number average molecular weight of from 1,000 to 1,000,000

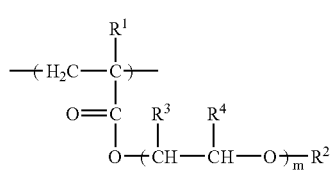
(I)

wherein $R^1$ is hydrogen or an alkyl group having 1 to 5 carbon atoms, $R^2$ is an alkyl group having 1 to 5 carbon atoms, $R^3$ and $R^4$ are each independently hydrogen or an alkyl group having 1 to 5 carbon atoms and may be the same or different from each other, and m is an integer of from 0 to 100, and

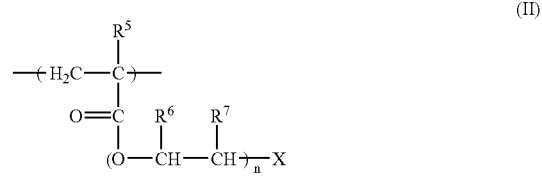
(II)

wherein $R^5$ is hydrogen or an alkyl group having 1 to 5 carbon atoms, $R^6$ and $R^7$ are each independently hydrogen or an alkyl group having 1 to 5 carbon atoms and may be the same or different from each other, n is an integer of from 1 to 100, and X is an isocyanate or hydroxyl group; and (b) a compound represented by formula (III)

$$Y-R^8-Y \tag{III}$$

wherein $R^8$ is a divalent hydrocarbon group having 1 to 20 carbon atoms, Y is an isocyanate or hydroxyl group provided that when X in formula (II) is an isocyanate group, Y is a hydroxyl group and that when X is a hydroxyl group, Y is an isocyante group.

The present invention will be described below in detail.

The process for producing solid polymer electrolytes of the present invention comprises reacting at least (a) an acrylic copolymer (Component (a)) comprising repeating units of formula (I) (Structural Unit I) and repeating units of formula (II) (Structural Unit II) in a molar ratio of from 1/5 to 1,000/1 and having a number average molecular weight of from 1,000 to 1,000,000 and (b) a compound of formula (III) (Component (b)).

First, Component (a) will be described.

In formula (I) representing the repeating unit of Component (a), $R^1$ is hydrogen or an alkyl group having 1 to 5, preferably 1 to 3 carbon atoms, $R^2$ is an alkyl group having 1 to 5, preferably 1 to 3 carbon atoms, and $R^3$ and $R^4$ are each independently hydrogen or an alkyl group having 1 to 5, preferably 1 to 3 carbon atoms and may be the same or different from each other. Examples of the alkyl groups for $R^1$, $R^2$, $R^3$, and $R^4$ are methyl, ethyl, i-propyl, n-propyl, n-butyl, t-butyl, and n-pentyl groups which may be the same or different. Particularly, $R^1$ is preferably hydrogen or methyl and $R^3$ and $R^4$ are each independently preferably hydrogen. "m" is an integer of from 0 to 100, preferably 1 or greater, more preferably 2 or greater and preferably 50 or less, more preferably 25 or less.

In formula (II) representing the other repeating unit of Component (a), $R^5$ is hydrogen or an alkyl group having 1 to 5, preferably 1 to 3 carbon atoms, and $R^6$ and $R^7$ are each independently preferably hydrogen or an alkyl group having 1 to 5, preferably 1 to 3 carbon atoms and may be the same or different from each other. Examples of the alkyl group for $R^5$, $R^6$, and $R^7$ are methyl, ethyl, i-propyl, n-propyl, n-butyl, t-butyl, and n-pentyl groups which may be the same or different from each other. Particularly, $R^5$ is preferably hydrogen or methyl, and $R^6$ and $R^7$ are each independently preferably hydrogen. "n" is an integer of from 1 to 100, preferably 2 or greater and preferably 50 or less, more preferably 25 or less.

Component (a) comprises the structural units I of formula (I) and the structural units II of formula (II) in a molar ratio thereof (Structural Unit I/Structural Unit II) of from 1/5 to 1,000/1, preferably 1/1 to 100/1. The number-average molecular weight of Component (a) is 1,000 or more, preferably 5,000 or more and 1,000,000 or less and preferably 100,000 or less. The term "number-average molecular weight" used herein denotes a value in terms of polystyrene obtained by a GPC measurement. No particular limitation is imposed on the bonding mode of these structural units which may, therefore be random or block.

Component (a) can be easily produced by any conventional method. Typically, for example, Component (a) may be produced by copolymerizing a compound represented by formula (IV) with a compound represented by formula (V):

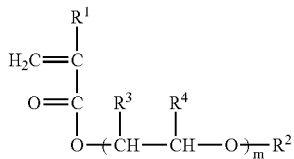

(IV)

wherein $R^1$, $R^2$, $R^3$, $R^4$, and m are the same as those defined in formula (I); and

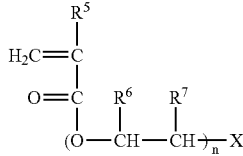

(V)

wherein $R^5$, $R^6$, $R^7$, n, and X are the same as those defined in formula (II).

Preferred examples of the compound of formula (IV) are methylmethacrylate and methoxypolyethylene glycol methacrylate, ethoxypolyethylene glycol methacrylate, methoxypolyethylene glycol acrylate, and ethoxypolyethylene glycol acrylate each having 1 to 100, preferably 2 to 50, and more preferably 2 to 25 oxyethylene units, and mixtures thereof. Among these, particularly preferred are methoxypolyethylene glycol methacrylate and methoxypolyethylene glycol acrylate.

Examples of the compound of formula (V) wherein X is an isocyante group are polyethylene glycol isocyante methacrylate and polyethylene glycol isocyante arcylate both having 1 to 100, preferably 1 to 50, and more preferably 2 to 25 oxyethylene units, and mixtures thereof.

Examples of the compound of formula (V) wherein X is a hydroxyl group are hydroxypolyethylene glycol methacrylate and hydroxypolyethylene glycol acrylate both having 1 to 100, preferably 1 to 50, and more preferably 2 to 25 oxyethylene units and mixtures thereof.

Specific examples of Component (a) are copolymers of methylmethacrylate and 2-hydroxyethylmethacrylate; methoxytetraethylene glycol acrylate and 2-hydroxyethylmethacrylate; methoxypolyethylene glycol methacrylate and hydroxytetraethylene glycol methacrylate; methoxynonaethylene glycol methacrylate and 2-hydroxyethylmethacrylate; methoxytetraethylene glycol acrylate and 2-hydroxyethylmethacrylate; methylmethacrylate and 2-isocyanatoethylmethacrylate; methoxytetraethylene glycol acrylate and 2-isocyanatoethylmethacrylate; methoxypolyethylene glycol methacrylate and 2-isocyanatoethylacrylate; methoxynonaethylene glycol methacrylate and 2-isocyanatoethylmethacrylate; and methoxytetraethylene glycol acrylate and 2-isocyanatoethylmethacrylate.

Two or more different compounds of formula (IV) may be copolymerized with one or two or more different compounds of formula (V). Alternatively, one or two or more different compounds of formula (IV) may be copolymerized with two or more different compounds of formula (V).

Copolymerization reaction may be conducted by any method selected from the conventional ones. Generally, a method may be employed in which polymerization is effected in the presence of a polymerization initiator in a solvent. In this case, the solvent may or may not be removed after completion of the polymerization. Alternatively, another operation such as refining may be conducted.

Next, Component (b) will be described.

The compounds of formula (III) wherein Y is a hydroxyl group, used as Component (b) of the present invention are generally referred to as diol compounds. In formula (III), $R^8$ is a divalent hydrocarbon group having 1 to 20, preferably 2 to 12 carbon atoms, such as alkylene, arylene, alkylarylene, and arylalkylene groups. Typical examples of the divalent hydrocarbon group are methylene, ethylene, propylene, trimethylene, tetramethylene, hexamethylene, toluylene, and xylylene groups. Specific examples of the diol compound are polyethylene glycol such as ethylene glycol, diethylene glycol, triethylene glycol, and tetraethylene glycol, polypropylene glycol such as propylene glycol, dipropylene glycol, and tripropylene glycol, 1,4-butanediol, 1,3-butanediol, 1,2-butanediol, 2,3-butanediol, 1,5-pentanediol, 1,4-pentanediol, 1,3-pentanediol, 1,2-pentanediol, 2,3-pentanediol, 2,4-pentanediol, 1,6-hexanediol, 1,5-hexanediol, 1,4-hexanediol, 2,5-hexanediol, 2,4-hexanediol, 2,3-hexanediol, 3,4-hexanediol, 1,7-heptanediol, 1,6-heptanediol, 1,5-heptanediol, 1,4-heptanediol, 1,3-heptanediol, 1,2-heptanediol, 2,6-heptanediol, 2,5-heptanediol, 2,4-heptanediol, 2,3-heptanediol, 3,5-heptanediol, 3,4-heptanediol, 1,8-octanediol, 1,2-octanediol, 1,9-nonanediol, 1,10-decanediol, 1,2-decanediol, 1,12-dodecanediol, 1,2-dodecanediol, 2-methyl-1,4-butanediol, 2-butene-1,4-diol, 3-butene-1,2-diol, 1,2-cyclohexanediol, 1,3-cyclohexanediol, 1,4-cyclohexanediol, 1,2-cyclopentanediol, 1,3-cyclopentanediol, 1,2-cyclooctanediol, 1,5-cyclooctanediol, 5-norbornene-2,2-dimethanol, and 5-norbornene-2,3-dimethanol. Two or more of these compounds may be mixed.

The compounds of formula (III) wherein Y is an isocyanate group are generally referred to as diisocyanate compounds. Specific examples of the diisocyanate compounds are hexamethylene diisocyanate, 2,4-toluylene diisocyanate, 2,6-toluylene diisocyanate, 4,4'-methylenebis(phenylisocyanate), m-xylylene diisocyanate, isophorone diisocyanate, and 1,5-naphthalene diisocyanate. Two or more of these compounds may be mixed.

The present invention is characterized in that Components (a) and (b) are reacted to be solidified. This solidification occurs as a result of the cross-linking reaction of Components (a) and (b).

A catalyst may be used for the cross-linking reaction. Eligible catalysts are amine compounds, tin compounds, lead compounds, and iron compounds. Examples of the amine compounds are N-methyl morpholine, triethylamine, N,N,N',N'-tetramethyl-1,3-butanediamine, and 1,4-diazabicyclo[2.2.2]octane. Examples of the tin compounds are tin(II)chloride, tin(IV)chloride, tetra-n-butyltin, tetraphenyltin, tri-n-butyltin acetate, di-n-dibutyltin dichloride, di-n-butyltin diacetate, dibutyltin dichloride, dilauric acid-n-dibutyltin, di-n-butyltindilaurylmercaptide, bis(2-ethylhexyl)tin oxide, and 2-ethylhexyl stannic acid. The lead compound may be lead naphthenate. The iron compound may be iron(III)acetylacetate.

The catalyst is used in an amount of from 0 to 100 percent by mol, preferably 0.0001 to 50 percent by mol, and more preferably 0.001 to 25 percent by mol of the total amount of a compound of formula (III).

The cross-linking reaction may be photo or heat reaction whose conditions are arbitrary selected depending on whether or not and what type of catalyst is used. For example, the heat cross-linking reaction is conducted at a temperature of from usually 40 to 150° C., preferably 60 to 100° C. for usually one minute or longer, preferably from 5 minutes to 24 hours.

Another optional component other than Components (a) and (b) may be added in the process of the present invention. The optional component may be an supporting electrolyte (Component (c)).

No particular limitation is imposed on the supporting electrolyte which may, therefore, be inorganic ion salts such as alkali metal salts and alkaline earth metal salts, quaternary ammonium salts, cyclic quaternary ammonium salts, and phosphonium quaternary salts. Specific examples are alkali metal salts of Li, Na, or K, such as $LiClO_4$, $LiSCN$, $LiBF_4$, $LiAsF_6$, $LiCF_3SO_4$, $LiPF_6$, $LiI$, $NaI$, $NaClO_4$, $NaBF_4$, $NaAsF_6$, $KSCN$, and $KCl$; quaternary and cyclic quaternary ammonium salts such as $(CH_3)_4NBF_4$, $(C_2H_5)_4NBF_4$, $(n-C_4H_9)_4NBF_4$, $(C_2H_5)_4NBr$, $(C_2H_5)_4NClO_4$ and $(n-C_4H_9)_4NClO_4$; phosphonium quaternary salts such as $(CH_3)_4PBF_4$, $(C_2H_5)_4PBF_4$, $(C_3H_7)_4PBF_4$, and $(n-C_4H_9)_4PBF_4$; and mixtures thereof. The supporting electrolyte is used in an amount of from 0 to 10 mol/kg, preferably 0 to 5 mol/kg, based on the whole electrolyte.

A solvent may be used as an another optional component hereinafter referred to as Component (d). No particular limitation is imposed on Component (d) as long as it is compatible to Components (a), (b), and (c). However, preferred solvents are those exhibiting polarity. Specific examples are methanol, ethanol, propylene carbonate, ethylene carbonate, dimethylsulfoxide, dimethoxyethane, acetonitrile, γ-butyrolactone, sulforan, 1,3-dioxane, N,N'-dimethylformamide, 1,2-dimethoxyethane, and tetrahydrofuran. These may be used alone or in combination. No particular limitation is imposed on the amount of the electrolyte as long as it is such a sufficient amount that Components (a) and (b) are dissolved and the curing of the whole electrolyte is not hindered.

The solid polymer electrolyte produced by the process of the present invention can be used in electrochromic devices such as electrochromic mirrors, smart windows, and displaying devices, secondary batteries, and capacitors.

As an example, the use of the electrolyte in an electrochromic device is described.

In the case of using the solid polymer electrolyte produced by the process of the present invention in an electrochromic device, it is a general procedure that an electrochromic compound is added in the solid polymer electrolyte or alternatively a layer of the solid polymer electrolyte is brought into contact with a layer of an electrochromic compound. The term "electrochromic compound" used herein denotes a compound exhibiting a reversible redox reaction upon application of an electric voltage and repeating coloration and decoloration by the redox reaction. In this case, any electrochromic compounds may be used such as anodic electrochromic compounds, cathodic electrochromic compounds, and compounds having both anodic electrochromic and cathodic electrochromic structures.

Examples of the anodic electrochromic compound are pyrazoline-based compound derivatives, metallocene compound derivatives, phenylenediamine compound derivatives, benzidine compound derivatives, phenazine compound derivatives, phenoxadine compound derivatives, phenothiazine compound derivatives, and tetrathiafulvalene derivatives.

Examples of the cathodic electrochromic compound are styryl compound derivatives, viologen compound derivatives, and anthraquinone-based compound derivatives.

Examples of the anodic electrochromic structure are pyrazoline-based compound derivative structures, metallocene compound derivative structures, phenylenediamine compound derivative structures, benzidine compound derivative structures, phenazine compound derivative structures, phenoxadine compound derivative structures, phenothiazine compound derivative structures, or tetrathiafulvalene derivative structures. Examples of the cathodic electrochromic structure are styryl compound derivative structures, viologen compound derivative structures and anthraquinone-based compound derivative structures.

No particular limitation is imposed on the amount of the electrochromic compound. In the case of using a solvent the use of which is though optional, the compound may be added in such an amount that it is solved in the solvent. However, the electrochromic compound is added in an amount of generally from 0 to 1 mol/L, preferably 0.001 to 0.5 mol/L, and more preferably 0.005 to 0.2 mol/L. Needless to mention, the solvent may not be used.

An electrochromic device using the solid polymer electrolyte produced by the present invention will be described below.

Two electrically conductive substrates are used in an electrochromic device. The term "electrically conductive substrate" refers to a substrate functioning as an electrode. Therefore, the electrically conductive substrates used herein encompass those made from electrically conductive materials and those obtained by laminating an electrically conductive layer over one or both surfaces of a non-electrically conductive substrate. Regardless of whether the substrate is electrically conductive or not, it has preferably a smooth surface at normal temperatures. The surface, however, may be flat or curved and deformable under stress as well.

At least one of the two electrically conductive substrates is transparent and the other may be transparent or opaque or may be a reflective electrically conductive substrate which is capable of reflecting light.

Generally, a device having electrically conductive substrates both of which are transparent is suitable for displays and smart windows, while a device having an electrically conductive transparent substrate and an opaque one is suitable for displays. A device having a transparent electrically conductive substrate and a reflective one is suitable for electrochromic mirrors.

The transparent electrically conductive substrate may be produced by laminating a transparent electrode layer over a transparent substrate. The term "transparent" used herein denotes an optical transmission of visible light ranging from 10 to 100 percent.

No particular limitation is imposed on the material of the transparent substrate, which, therefore, may be color or colorless glasses, tempered glasses or color or colorless transparent resins. Specific examples of such resins are polyethylene terephtalate, polyethylene naphtalate, polyamide, polysulfone, polyether sulfone, polyether etherketone, polyphenylene sulfide, polycarbonate, polyimide, polymethyl methacrylate, and polystyrene.

The transparent electrode layer may be made of a metal thin film of gold, silver, chrome, copper, and tungsten or an electrically conductive thin film of metal oxides. Specific examples of the metal oxides are ITO ($In_2O_3$—$SnO_2$), tin oxide, silver oxide, zinc oxide, and vanadium oxide. The film thickness is usually within the range of 10 to 500 nm and preferably 50 to 300 nm. The surface resistance of the film is within the range of usually 0.5 to 500 Ω/sq. and preferably 1 to 50 Ω/sq. Any suitable method of forming a transparent electrode layer may be employed depending on the type of metals and/or metal oxides forming the electrode. The transparent electrode layer may be formed by vacuum evaporation, ion-plating, sputtering, and sol-gel methods.

For the purpose of imparting oxidation-reduction capability and electric double layer capacitance and improving electric conductivity, an opaque electrode activator may be partially applied to the surface of the transparent electrode layer. The electrode activator may be a metal such as copper, silver, gold, platinum, iron, tungsten, titanium and lithium, an organic material having oxidation-reduction capability, such as polyaniline, polythiophen, polypyrrole, and phthalocyanine, a carbon material such as active carbon and graphite, a metal oxide such as $V_2O_5$, $MnO_2$, NiO, and $Ir_2O_3$, and a mixture thereof.

Upon the formation of the electrode activator over a transparent electrode layer, it is necessary not to harm the transparency thereof excessively. Therefore, the opaque electrode activator may be applied onto an electrode by forming thin stripes or dots of a composition comprising an active carbon fiber, graphite, and an acrylic resin over a transparent ITO layer or forming mesh of a composition comprising $V_2O_5$, acetylene black, and butyl rubber over a gold thin film.

The opaque electrically conductive substrate may be produced by substituting the transparent substrate of the above-described transparent electrically conductive substrate with an opaque substrate such as various plastics, glasses, woods, and stones if the substrate need not be transparent.

Eligible reflective electrically conductive substrates for the present invention are (1) laminates obtained by laminating a reflective electrode layer over a non-electrically conductive transparent or opaque substrate, (2) laminates obtained by laminating a transparent electrode layer over one surface of a non-electrically conductive transparent substrate and a reflective layer over the other surface thereof, (3) laminates obtained by laminating a reflective layer over a non-electrically conductive transparent substrate and a transparent electrode layer over the reflective layer, (4) laminates obtained by laminating a transparent electrode layer over a reflective plate used as a substrate, and (5) plate-like substrates which themselves have functions as a photo-reflective layer and an electrode layer.

The term "reflective electrode layer" denotes a thin film which has a mirror surface and is electrochemically stable in performance as an electrode. Specific examples of such a thin film are a metal film of gold, platinum, tungsten, tantalum, rhenium, osmium, iridium, silver, nickel or palladium and an alloy film of platinum-palladium, platinum-rhodium or stainless. Any suitable method of forming such a thin film may be employed such as vacuum evaporation, ion-plating, and sputtering methods.

The substrate to be provided with a reflective electrode layer may be transparent or opaque. Therefore, the substrate may be the above-described transparent substrate and various plastics, glasses, woods and stones which may not be transparent.

The term "reflective plate" or "reflective layer" denotes a substrate having a mirror surface or a thin film which may be a plate of silver, chrome, aluminum, stainless, nickel-chrome or a thin film thereof.

If the above described reflective electrode layer per se is rigid, a substrate may not be needed.

Although no particular limitation is imposed on the thickness of the solid polymer electrolyte, it is usually from 1 μm to 3 mm, preferably 10 um to 1 mm. No particular limitation is imposed on the method of forming the solid electrolyte to be used for an electrochromic device. The above-described solid polymer electrolyte may be formed by injecting a precursor solution thereof into a space between a pair of electrically conductive substrates disposed so as to oppose to each other and having sealed peripheral edges, by vacuum injection or atmospheric injection or a meniscus method and then curing the solution. Alternatively, the solid electrolyte may be produced by forming the solid electrolyte layer over one of the two electrically conductive substrates and then superimposing the other substrate thereover.

APPLICABILITY TO THE INDUSTRY

The process of the present invention enables the production of a solid polymer electrolyte with high ion conductivity at ease. The resulting solid polymer electrolyte has moderate flexibility and excellent plasticity. Therefore, when the solid polymer electrolyte produced by the process of the present invention is used for producing various devices, they are easily produced and will have various advantages such as durability and resistance to temperature changes and impact.

EXAMPLES

The present invention will be described in detail with reference to the following examples but are not limited thereto.

Example 1

To 400 g of dimethoxyethane held at a temperature of 70° C. was added dropwise a mixed solution of 248 g (0.5 mol) of methoxypolyethylene glycol methacrylate (the number of oxyethylene unit: 9) manufactured by SHIN NAKAMURA CHEMICAL CO. LTD. under the trade name of M90G, 3.88 g (0.025 mol) of 2-methacryloxyethyl isocianate manufactured by SHOWA DENKO K. K. under the trade name of Karenz MOI, 5 g of azobisisobutylonitrile, and 50 g of dimethoxyethane over a period of one hour. Thereafter, the mixture was stirred at the same temperature for another one hour and then heated to 80° C. and stirred for one hour thereby obtaining a solution of a polymer whose concentration was 36 mass %, represented by formula (VI) below. The number average molecular weight and m/n of this polymer were 30,000 and 20/1, respectively.

To 50 g of this polymer solution were added 1.0 g of triethylene glycol, 4 g of lithium perchlorate, and 0.2 g of dibutyltin dichloride, followed by stirring under an atmosphere of nitrogen to make the mixture homogeneous.

The solution was then cast over a glass and heated at a temperature of 80° C. for one hour thereby obtaining a transparent solid polymer electrolyte film with a thickness of 80 μm. A complex impedance method was conducted and revealed that the ion conductivity of the film was $1.2 \times 10^{-4}$ S/cm at 25° C.

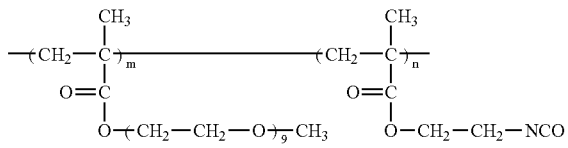

(VI)

Example 2

To 400 g of propylene carbonate held at a temperature of 70° C. was added dropwise a mixed solution of 138 g (0.5 mol) of methoxypolyethylene glycol methacrylate (the number of oxyethylene unit: 4) manufactured by SHIN NAKAMURA CHEMICAL CO. LTD. under the trade name of M40GN, 7.75 g (0.05 mol) of 2-methacryloxyethyl isocianate manufactured by SHOWA DENKO K. K. under the trade name of Karenz MOI, 5 g of azobisisobutylonitrile, and 50 g of propylene carbonate over a period of one hour. Thereafter, the mixture was stirred at the same temperature for another one hour and then heated to 80° C. and stirred for one hour thereby obtaining a solution of a polymer whose concentration was 24 mass %, represented by formula (VII) below. The number average molecular weight and m/n of this polymer were 25,000 and 10/1, respectively.

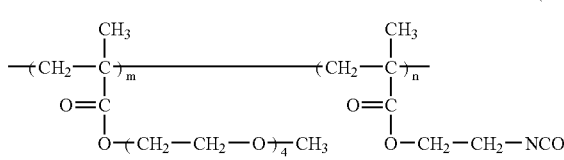

(VII)

To 50 g of this polymer solution were added 0.7 g of tetraethylene glycol, 5 g of tetrabutylammoniumtetrafluoro borate, 4 g of N,N'-diheptylviologendiperchlorate, 2 g of ferrocene, and 0.2 g of dilauric acid-n-dibutyltin thereby preparing a precursor solution of a solid polymer electrolyte.

Example 3

To 400 g of dimethoxyethane held at a temperature of 70° C. was added dropwise a mixed solution of 248 g (0.5 mol) of methoxypolyethylene glycol methacrylate (the number of oxyethylene unit: 9) manufactured by SHIN NAKAMURA CHEMICAL CO. LTD. under the trade name of M90G, 3.25 g (0.025 mol) of 2-hydroxyethylmethacrylate, 5 g of azobisisobutylonitrile, and 50 g of dimethoxyethane over a period of one hour. Thereafter, the mixture was stirred at the same temperature for another one hour and then heated to 80° C. and stirred for one hour thereby obtaining a solution of a polymer whose concentration was 36 mass %, represented by formula (VIII) below. The number average molecular weight and m/n of this polymer were 30,000 and 20/1, respectively.

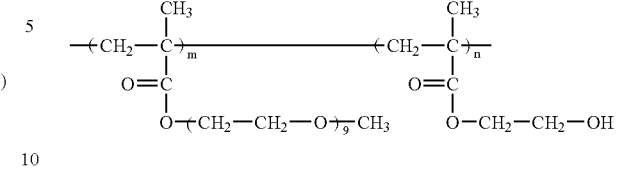

(VIII)

To 50 g of this polymer solution were added 0.7 g of hexamethylene diisocyanate, 4 g of lithium perchlorate, and 0.2 g of dibutyltin dichloride, followed by stirring under an atmosphere of nitrogen to make the mixture homogeneous.

The solution was then cast over a glass and heated at a temperature of 80° C. for one hour thereby obtaining a transparent solid polymer electrolyte film with a thickness of 80 μm. A complex impedance method was conducted and revealed that the ion conductivity of the film was $6.2 \times 10^{-4}$ S/cm at 25° C.

Example 4

To 400 g of propylene carbonate held at a temperature of 70° C. was added dropwise a mixed solution of 138 g (0.5 mol) of methoxypolyethylene glycol methacrylate (the number of oxyethylene unit: 4) manufactured by SHIN NAKAMURA CHEMICAL CO. LTD. under the trade name of M40GN, 6.5 g (0.05 mol) of 2-hydroxyethylmethacrylate, 5 g of azobisisobutylonitrile, and 50 g of propylene carbonate over a period of one hour. Thereafter, the mixture was stirred at the same temperature for another one hour and then heated to 80° C. and stirred for one hour thereby obtaining a solution of a polymer whose concentration was 24 mass %, represented by formula (IX) below. The number average molecular weight and m/n of this polymer were 25,000 and 10/1, respectively.

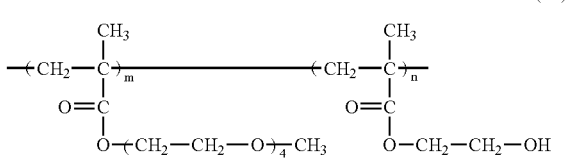

(IX)

To 50 g of this polymer solution were added 0.7 g of 2,4-toluylene diisocyanate, 5 g of tetrabutylammoniumtetrafluoro borate, 4 g of N,N'-diheptylviologendiperchlorate, 2 g of ferrocene, and 0.2 g of dilauric acid-n-dibutyltin thereby preparing a precursor solution of a solid polymer electrolyte.

Preparation of Electrochromic Mirror

An epoxy sealant was applied in the form of lines along the peripheral edges except a portion to be used as an inlet of solution, of an ITO-coated transparent glass substrate with a size of 230 mm×60 mm. Over this glass substrate was superposed a reflective glass substrate one of which surface was coated with silver (mirror) and the other of which was coated with ITO such that the ITO surfaces face each other. The sealant was then cured thereby obtaining an empty cell with an inlet and a cell gap of 70 μm.

The above precursor solution was injected into the cell.

After sealing the inlet with an epoxy resin, the cell was heated at a temperature of 85° C. for one hour. The cell when assembled was not colored and had a reflectance of about 80% but was immediately colored upon application of a voltage of 1.0 V. The reflectance of a light of 633 nm of the cell was about 10%.

When the cell was broken, the electrolyte therein was solid and thus any liquid did not scattered.

The invention claimed is:

1. A process for producing a solid polymer electrolyte wherein at least components (a) and (b) below are reacted:
    (a) an acrylic copolymer comprising repeating units (Structural Unit I) represented by formula (I) below and repeating units (Structural Unit II) represented by formula (II) below in a molar ratio of from 1/5 to 1,000/1 and having a number average molecular weight of from 1,000 to 1,000,000

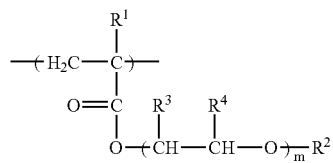

(I)

wherein $R^1$ is hydrogen or an alkyl group having 1 to 5 carbon atoms, $R^2$ is an alkyl group having 1 to 5 carbon atoms, $R^3$ and $R^4$ are each independently hydrogen or an alkyl group having 1 to 5 carbon atoms and are the same or different from each other, and m is an integer of from 0 to 100, and

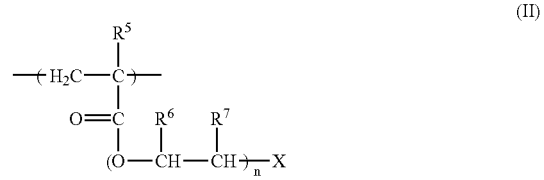

(II)

wherein $R^5$ is hydrogen or an alkyl group having 1 to 5 carbon atoms, $R^6$ and $R^7$ are each independently hydrogen or an alkyl group having 1 to 5 carbon atoms and are the same or different from each other, n is an integer of from 1 to 100, and X is an isocyanate group; and (b) a compound represented by formula (III)

$$Y-R^8-Y \qquad (III)$$

wherein $R^8$ is a divalent hydrocarbon group having 1 to 20 carbon atoms, and each Y is a hydroxyl group.

* * * * *